(12) United States Patent
Shao et al.

(10) Patent No.: US 12,158,748 B2
(45) Date of Patent: *Dec. 3, 2024

(54) INDUSTRIAL INTERNET OF THINGS FOR CONTROLLING SUPPLY OF ACCESSORIES AND CONTROL METHODS THEREOF

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Bin Liu, Chengdu (CN); Xiaojun Wei, Chengdu (CN); Yuefei Wu, Chengdu (CN)

(73) Assignee: CHENGDU QINCHUAN IOT TECHNOLOGY CO., LTD., Chengdu (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/448,890

(22) Filed: Aug. 11, 2023

(65) Prior Publication Data
US 2023/0384772 A1 Nov. 30, 2023

Related U.S. Application Data

(63) Continuation of application No. 17/819,635, filed on Aug. 14, 2022, now Pat. No. 11,782,424.

(30) Foreign Application Priority Data

Jun. 7, 2022 (CN) .......................... 202210634309.0

(51) Int. Cl.
*G05B 19/418* (2006.01)
(52) U.S. Cl.
CPC ... *G05B 19/41865* (2013.01); *G05B 19/4183* (2013.01); *G05B 19/4185* (2013.01); *G05B 19/41885* (2013.01)

(58) Field of Classification Search
USPC .......................................... 700/99
See application file for complete search history.

(56) References Cited

U.S. PATENT DOCUMENTS

| 10,575,072 B1 | 2/2020 | Shao | |
|---|---|---|---|
| 10,753,787 B1 * | 8/2020 | Shiee | ................... G06Q 10/087 |

(Continued)

FOREIGN PATENT DOCUMENTS

| CN | 110874718 A | * | 3/2020 |
|---|---|---|---|
| CN | 111080326 A | | 4/2020 |

(Continued)

OTHER PUBLICATIONS

CN-110766528-A (Year: 2020).*

(Continued)

*Primary Examiner* — Hien D Khuu
(74) *Attorney, Agent, or Firm* — Porus IP LLC

(57) ABSTRACT

The present disclosure provides an industrial Internet of Things for controlling a supply of accessories and control methods. The industrial Internet of Things comprises a user platform, a service platform, a management platform, a sensor network platform, and an object platform interacting in sequence. The object platform is configured to include different accessory supply devices, each of which is configured with a data collector. The sensor network platform receives and sends accessory supply data to different management sub-platforms. The different management sub-platforms receive the different accessory supply data, after data processing, store and send at least one processing result data to different service sub-platforms. The different service sub-platforms receive and send corresponding processing result data to the user platform separately. The user platform generates a first instruction to a corresponding service sub-platform based on the at least one processing result data.

20 Claims, 5 Drawing Sheets

(56) References Cited

U.S. PATENT DOCUMENTS

2019/0273784 A1  9/2019  Shao
2020/0236177 A1  7/2020  Becker et al.
2020/0326684 A1  10/2020  Chand et al.

FOREIGN PATENT DOCUMENTS

| CN | 111967822 A | | 11/2020 |
| CN | 112884532 A | | 6/2021 |
| CN | 111932126 B | | 10/2021 |
| CN | 114449023 A | | 5/2022 |
| CN | 115271600 A | * | 11/2022 |
| WO | 2018177174 A1 | | 10/2018 |
| WO | 2021258235 A1 | | 12/2021 |

OTHER PUBLICATIONS

CN-111815222-A (Year: 2020).*
CN-1835004-A (Year: 2006).*
Luo, Xu et al., Real-time Data Transmission Design and Performance Test in General Iot Service Platform, Computer Knowledge and Technology, 10(35): 8379-8382, 2014.
Yang, Weijun et al., Intelligent Agent-Based Predict System With Cloud Computing for Enterprise Service Platform in IoT Environment, IEEE Access, 9: 11843-11871, 2021.
Yang, Luxia et al., Design of Overall Equipment Efficiency Monitoring System Based on Industrial Internet of Things, Process Automation Instrumentation, 42(3): 94-97, 2021.

* cited by examiner

INDUSTRIAL INTERNET OF THINGS FOR CONTROLLING SUPPLY OF ACCESSORIES AND CONTROL METHODS THEREOF

CROSS-REFERENCE TO RELATED APPLICATIONS

This application is a continuation of U.S. application Ser. No. 17/819,635, filed on Aug. 14, 2022, which claims priority to Chinese Patent Application No. 202210634309.0, filed on Jun. 7, 2022, the contents of each of which are hereby incorporated by reference.

TECHNICAL FIELD

The present disclosure relates to the field of intelligent manufacturing technology, and in particular, to an industrial Internet of Things for controlling a supply of accessories and control methods thereof.

BACKGROUND

In the field of intelligent manufacturing technology, each automatic production line or production device performs automatic accessory supply based on an accessory supply device. Different accessories correspond to different accessory supply devices. The accessory supply device is generally configured and stored in advance according to production-consumption amount, working time, etc., so as to supply in time to meet the need for accessories.

In existing technologies, the count of accessory supply devices is generally large. The count of accessories of some large devices and products may be dozens of hundreds. In actual production, the normal use amount and loss amount of each accessory are different. Even if there is a margin of accessories in advance, in the case of different working time and different production amounts, the count of accessories for part accessory supply devices cannot complete the entire production needs. It is necessary to obtain consumption amount and storage amount in real-time based on the specific usage situation and production conditions, so as to supply accessories to accessory supply devices in advance and avoid the problem that the accessory supply devices cause production devices discontinued because the accessories cannot be replenished in time. To solve the above technical problems, it needs to obtain the inventory of the accessories, consumption amount and working time of the accessory supply device, etc. Some of these data may change at any time, it needs instant statistics and also needs to count all the accessory supply devices. It causes that the demand for the data amount is large when being obtained, and the data processing is extremely difficult to achieve because the data is large and complex.

Based on this, it is urgently needed to solve how to regulate the accessories of the accessory supply devices quickly, efficiently, and in real-time.

SUMMARY

The technical problem to be solved by the present disclosure is to provide an industrial Internet of Things for controlling a supply of accessories. The Internet of Things may obtain amounts of the inventory accessories and accessories consumption situations of different accessory supply devices independently in real-time based on the structure of the service platform and the management platform which are independently arranged. The Internet of Things may regulate the accessories independently in real-time to achieve separate control of all accessory supply devices.

The present disclosure is implemented through the following technical solutions: an industrial Internet of Things for controlling a supply of accessories, comprising a user platform, a service platform, a management platform, a sensor network platform, and an object platform interacting in sequence.

The object platform is configured to include different accessory supply devices, each of which is configured with a data collector.

When the accessory supply device executes accessory supply, the data collector collects amounts of inventory accessories and an average rate of the accessory supply of the accessory supply device, packs the amounts of inventory accessories and the average rate of the accessory supply of the accessory supply device to form accessory supply data, and uploads to the sensor network platform.

The sensor network platform receives the accessory supply data, performs numbering on the accessory supply data of the different accessory supply devices to form configuration files recognized by the management platform, and sends the configuration files to different management sub-platforms in the management platform according to numbers.

The different management sub-platforms receive the different accessory supply data, after data processing, store and send at least one processing result data to different service sub-platforms in the service platform.

The different service sub-platforms receive corresponding processing result data and send them to the user platform separately through a corresponding information channel.

The user platform generates a first instruction to a corresponding service sub-platform based on the at least one processing result data.

The corresponding service sub-platform receives the first instruction and directly issues to a corresponding management sub-platform.

After parsing the first instruction, the corresponding management sub-platform generates a second instruction recognized by the accessory supply devices based on the processing result data, and sends the second instruction to the sensor network platform.

The sensor network platform issues the second instruction to a corresponding accessory supply device based on a corresponding number, the corresponding accessory supply device executing an operation of accessory supply based on the second instruction.

Based on the above technical solutions, a count of the management sub-platforms is equal to a count of the service sub-platforms, and the management sub-platforms and the service sub-platforms correspond one-by-one, each group of the corresponding management sub-platforms and the corresponding service sub-platforms corresponding to the accessory supply device with a same number.

Based on the above technical solutions, different management sub-platforms receive the different accessory supply data, and after data processing, store and send the at least one processing result data to the different service sub-platforms.

The management sub-platforms are configured to at least extract the amounts of the inventory accessories of the accessory supply devices in the accessory supply data as first basic data after receiving the accessory supply data of the accessory supply devices corresponding to corresponding numbers, determine demand amounts of accessories of the accessory supply devices corresponding to different production stages within a preset time; and compare the first basic data with the demand amounts of the accessories in the management sub-platforms, judge whether the inventory of the accessories of the corresponding accessory supply device is sufficient, output comparison data and a judgment result, and send the comparison data and the judgment result as the processing result data to the corresponding service sub-platform.

Based on the above technical solutions, to determine the demand amounts of the accessories of the accessory supply devices corresponding to the different production stages within the preset time, the management platform is configured to obtain normal consumption amounts and abnormal loss amounts of accessories corresponding to the different production stages within the preset time, obtain historical supply amounts of the accessory supply devices corresponding to the different production stages; and determine the demand amounts of the accessories of the accessory supply devices corresponding to the different production stages within the preset time based on the historical supply amounts, the normal consumption amounts, and the abnormal loss amounts.

Based on the above technical solutions, to determine the demand amounts of the accessories of the accessory supply devices corresponding to the different production stages within the preset time, the management platform is configured to obtain production features and worker features of each production stage; and determine the demand amounts of the accessories of the accessory supply devices corresponding to the different production stages within the preset time by processing the production features and the worker features based on a first prediction model.

Based on the above technical solutions, to determine the demand amounts of the accessories of the accessory supply devices corresponding to the different production stages within the preset time, the management platform is configured to obtain a direct loss rate of the accessories in each production stage; obtain a rejection rate in the each production stage; and determine the demand amounts of the accessories of the accessory supply devices corresponding to the different production stages within the preset time based on the direct loss rate and the rejection rate.

Based on the above technical solutions, comparing the first basic data with the demand amounts of the accessories pre-stored in the management sub-platforms, judging whether the inventory of the accessories of the corresponding accessory supply device is sufficient includes: obtaining a difference of accessories by subtracting the demand amount of the accessories from the first basic data and retaining a positive or negative symbol of the difference of the accessories; judging that the inventory of the accessories of the accessory supply device is sufficient at this time based on the difference of the accessories being positive, and using the difference of the accessories and the judgment result as the processing result data; or judging that the inventory of the accessories of the accessory supply device is insufficient at this time based on the difference of the accessories being negative, and using the difference of the accessories and the judgment result as the processing result data.

Based on the above technical solutions, the different management sub-platforms receive the different accessory supply data, and after data processing, store and send the processing result data to the different service sub-platforms including: the management sub-platforms extracting rate of the accessory supply in the accessory supply data simultaneously after receiving the accessory supply data of the accessory supply devices corresponding to the numbers, obtaining calculation results as second basic data by calculating the rate of the accessory supply and remaining production working time in the corresponding management sub-platforms, the remaining production working time being remaining total time needed to be supplied by the corresponding accessory supply devices, obtaining a data difference and retaining a positive or negative symbol by performing a difference operation between the second basic data and the first basic data; covering the first basic data by the second basic data based on the data difference being positive, and performing a comparison and a judgment by the second basic data and the demand amounts of the accessories, or deleting the second basic data based on the data difference being negative, and performing a comparison and a judgment by the first basic data and the demand amounts of the accessories directly.

Based on the above technical solutions, after parsing the first instruction, the corresponding management sub-platform generates a second instruction recognized by the accessory supply devices based on the processing result data, and sends the second instruction to the sensor network platform including: the user platform generating a process end instruction correspondingly as the first instruction when the difference of the accessories is positive; after parsing the first instruction, the corresponding management sub-platform deleting the stored processing result data, and stopping sending the second instruction; or the user platform generating an accessory supply instruction correspondingly as the first instruction when the difference of the accessories is negative; after parsing the first instruction, the corresponding management sub-platform using an absolute value of the difference of the accessories as supply amount data, generating the second instruction after performing a data processing on the supply amount data, the corresponding accessory supply device executing the operation of the accessory supply based on the supply amount data in the second instruction.

Based on the above technical solutions, the first instruction further includes a time of executing the accessory supply, the management sub-platform writes the time of executing the accessory supply into the second instruction after parsing the first instruction; and after receiving the second instruction, the corresponding accessory supply device extracts the time of executing the accessory supply and executes the operation of the accessory supply at the time of executing the accessory supply.

The present disclosure also provides a control method for an industrial Internet of Things for controlling a supply of accessories based on the industrial Internet of Things for controlling a supply of accessories, which comprises a user platform, a service platform, a management platform, a sensor network platform, and an object platform interacting in sequence.

The object platform is configured to include different accessory supply devices, each of which is configured with a data collector.

The control method includes: when the accessory supply devices execute accessory supply, collecting amounts of inventory accessories and an average rate of the accessory supply of the accessory supply devices, packing the amounts of inventory accessories and the average rate of the accessory supply of the accessory supply device to form accessory supply data and uploading the accessory supply data to the sensor network platform by the data collector; receiving the accessory supply data, performing numbering on the accessory supply data of the different accessory supply devices to form configuration files recognized by the management platform, and sending the configuration files to different management sub-platforms in the management platform according to numbers by the sensor network platform; receiving the different accessory supply data, after data processing, storing and sending at least one processing result data to different service sub-platforms in the service platform by the different management sub-platforms; receiving corresponding processing result data and sending them to the user platform separately through a corresponding information channel by the different service sub-platforms; generating a first instruction to a corresponding service sub-platform based on the at least one processing result data by the user platform; receiving the first instruction and directly issues it to a corresponding management sub-platform by the corresponding service sub-platform, after parsing the first instruction, generating a second instruction recognized by the accessory supply devices based on the processing result data, sending the second instruction to the sensor network platform by the corresponding management sub-platform, and issuing the second instruction to a corresponding accessory supply device based on a corresponding number by the sensor network platform, executing an operation of accessory supply based on the second instruction by the corresponding accessory supply device.

Compared with the existing technology, the beneficial effect of the present disclosure is as follows: the industrial Internet of Things for controlling a supply of accessories and control methods of the present disclosure are based on the five-platform structure to build the Internet of Things. The service platform and the management platform use an independent arrangement, and each corresponding platform includes multiple independent sub-platforms, so as to use the independent service platform and the independent management platform for different accessory supply devices to form independent data processing, management, and transmission channels, reducing the amount of data processing and transmission of each platform, and reducing the computing pressure and the transmission pressure of each platform in the entire Internet of Things. Through the sensor network platform using a centralized arrangement, it may uniformly receive data and send data for multiple accessory supply devices, and each data source may be identified and transmitted separately, and the data format may be uniform, which reduces the difficulty of the data processing of the entire Internet of Things. In addition, for the newly increased or decreased accessory supply devices, the sensor network platform may also ensure that the accessory supply devices may work normally.

When the present disclosure is used, the industrial Internet of Things for controlling a supply of accessories and control methods thereof may be combined. The situation of accessories storage and consumption corresponding to the accessory supply device may be obtained in real-time, and the collecting data may be uploaded in real-time by the data collector. Data processing and transmission may be performed separately based on the independent service platform and the independent management platform, and different data processing parameters may be set for different accessory supply devices, thereby regulating the inventories of the accessories of the different accessory supply devices, implementing the Internet of Things model of unified data receiving and sending, classification processing, and transmission, and the data processing amount being large and accurate.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which the same reference numerals represent the same structures, and wherein.

DETAILED DESCRIPTION

Figure 1:
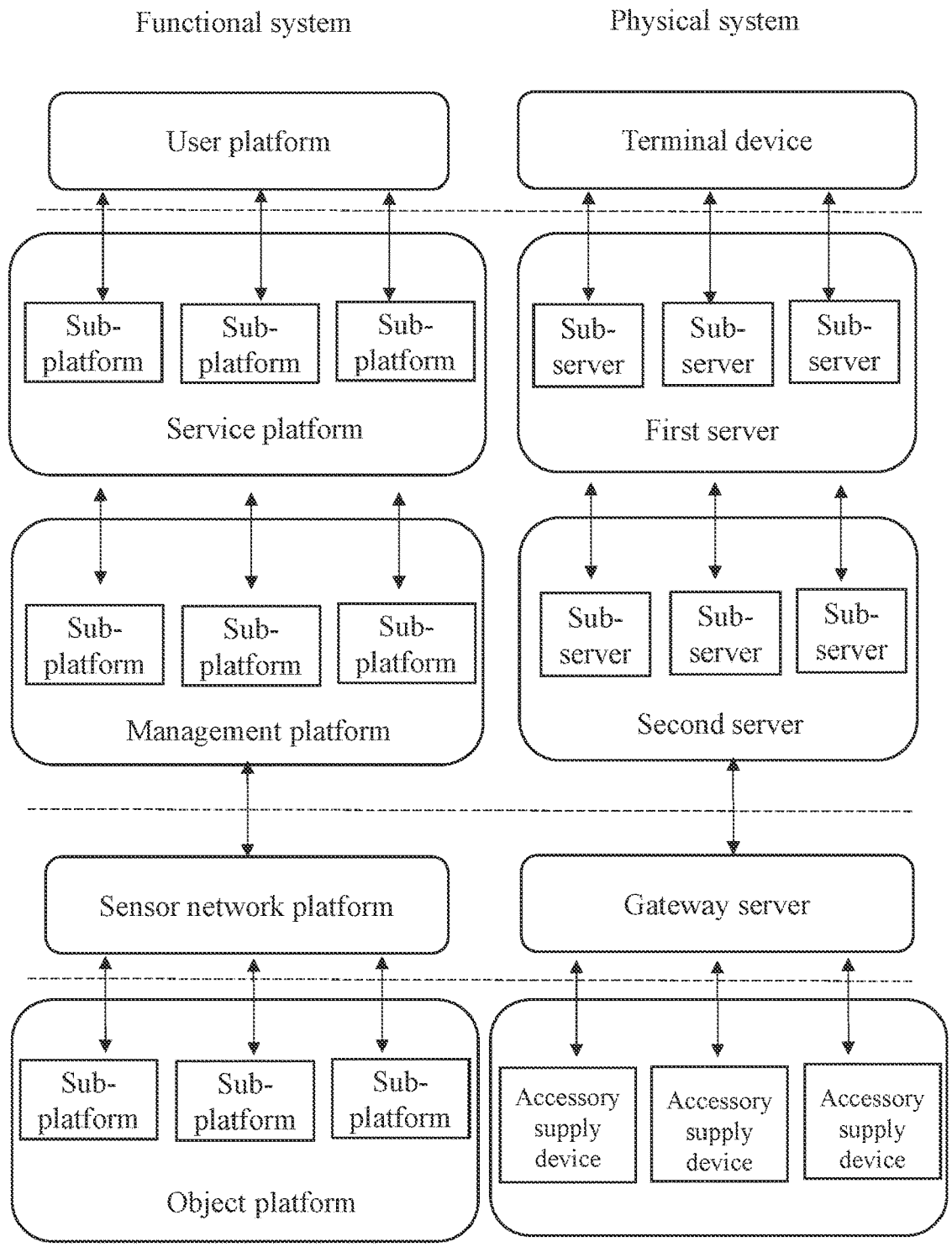
FIG. 1 is a structural framework diagram of the industrial Internet of Things for regulating an inventory of accessories according to some embodiments of the present disclosure.

In order to more clearly illustrate the technical solutions of the embodiments of the present disclosure, the following will briefly introduce the drawings that need to be used in the description of the embodiments. Obviously, the drawings in the following description are only some examples or embodiments of the present disclosure, and those skilled in the art may apply this present disclosure to other similar situations based on these drawings on the premise of not paying creative labor. Unless obviously obtained from the context or the context illustrates otherwise, the same numeral in the drawings refers to the same structure or operation.

It should be understood that "systems", "devices", "units", and/or "modules" used herein are one method for distinguishing different components, elements, components, parts, or assemblies of different levels. However, if other words may achieve the same purpose, the words may be replaced by other expressions.

As shown in the present disclosure and the claims, unless the context clearly suggests exceptional circumstances, the words "a", "an" and/or "the" do not specifically refer to the singular, but may also include the plural. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to some embodiments of the present disclosure. It should be understood that the previous or back operations may not be accurately implemented in order. Conversely, the operations may be implemented in an inverted order, or simultaneously. At the same time, other operations may also be added to these processes, or a certain step or several steps may be removed from these processes.

In order to make the purpose, technical scheme and advantages of the present disclosure more clear, the present disclosure is further described in detail below in combination with the embodiments and drawings. The schematic embodiment and description of the present disclosure are only used to explain the present disclosure and are not used as a limitation of the present disclosure.

The first embodiment of the present disclosure aims to provide an industrial Internet of Things for regulating an inventory of accessories. The industrial Internet of Things for regulating an inventory of accessories uses a five-platform Internet of Things technology, which uses a service platform and a management platform with a dual independent platform-type, as well as a centralized sensor network platform, which not only implements the classification transmission, and processing of data, but also implements an overall control of data. It may be widely used in intelligent production lines or intelligent assembly lines of various manufacturing industries such as medicine, food, machinery, device, electronic device, and other fields. For example, it may be used for the intelligent production line of the membrane gas meter, which has many features of clear data transmission classification, low computing costs of each platform, and easy controlling of data.

FIG. 1 is a structural framework diagram of the industrial Internet of Things for regulating an inventory of accessories according to some embodiments of the present disclosure. As shown in FIG. 1, the industrial Internet of Things for regulating an inventory of accessories includes a user platform, a service platform, a management platform, a sensor network platform, and an object platform interacting in sequence.

The service platform and the management platform both use an independent arrangement, and the sensor network platform uses a centralized arrangement. The independent arrangement means that the service platform or the management platform uses different sub-platforms to store, process, and/or transmit the data of different object platform. The centralized arrangement means that the sensor network platform uniformly receives data, uniformly processes data, and uniformly sends data.

The object platform is configured to include different accessory supply devices, each of which is configured with a data collector.

When the accessory supply device executes accessory supply, the data collector collects amounts of inventory accessories and an average rate of the accessory supply of the accessory supply devices, packs them to form accessory supply data, and uploads the accessory supply data to the sensor network platform.

The sensor network platform receives the accessory supply data, performs numbering on the accessory supply data of the different accessory supply devices to form configuration files recognized by the management platform, and sends the configuration files to different management sub-platforms in the management platform according to numbers.

The different management sub-platforms receive the different accessory supply data, after data processing, store and send at least one processing result data to different service sub-platforms in the service platform.

The different service sub-platforms receive corresponding processing result data and send them to the user platform separately through a corresponding information channel.

The user platform generates a first instruction to a corresponding service sub-platform based on the at least one processing result data.

The corresponding service sub-platform receives the first instruction and directly issues it to a corresponding management sub-platform.

After parsing the first instruction, the corresponding management sub-platform generates a second instruction recognized by the accessory supply devices based on the processing result data, and sends the second instruction to the sensor network platform.

The sensor network platform issues the second instruction to a corresponding accessory supply device based on a corresponding number, and the corresponding accessory supply device executes an operation of accessory supply based on the second instruction.

As an existing Internet of Things architecture, the user platform is configured as a terminal device that interacts with users. The service platform is configured as a first server, which receives instructions of the user platform and sends them to the management platform, and extracts the information required for processing the user platform from the management platform and sends it to the user platform. The management platform is configured as a second server, which controls the operation of the object platform and receives feedback data from the object platform. The sensor network platform is configured as a communication network and a gateway for the interaction of the object platform and the management platform.

In the intelligent manufacturing device on the intelligent production line or the intelligent assembly line, the accessories required during the manufacturing process are supplied and supplemented by a unified accessory supply system. A complete accessory supply system completes accessories delivery by a plurality of different accessory supply devices and a transmission system. In the existing technology, the accessory supply device is configured in advance according to the total amount of accessories, working time, and unit time consumption amount. Before starting of each time, it is necessary to perform accessory supply or accessory detection. Due to a large number of accessory supply devices, each supply or detection takes more time. In addition, in the actual production process, accessories loss may increase the use amounts of accessories, which may cause that the inventory of the accessories of the accessory supply device often cannot meet the needs, thereby affecting the production and causing the suspension of production device. However, general accessory supply devices are limited by the inventory of the accessories, which cannot accumulate a large number of accessories. Therefore, in the existing intelligent manufacturing, a large number of manual coordination compensation is needed, which cannot implement a fully automated production. Furthermore, due to a large number of accessory supply devices, the details and numbers of each accessory are also large and tedious, resulting in that automatic compensation for accessories is also difficult to implement.

The industrial Internet of Things for regulating an inventory of accessories of the present disclosure is built based on the five-platform structure. The service platform and the management platform use an independent arrangement, and each corresponding platform includes multiple independent sub-platforms. Therefore, it can use the independent service platform and the independent management platform for different accessory supply devices to form independent data processing, management, and transmission channels, reducing the amount of data processing and transmission of each platform, and reducing the computing pressure and the transmission pressure of each platform in the entire Internet of Things. Through the sensor network platform with a centralized arrangement, it can uniformly receive data and send data for multiple accessory supply devices, and each data source can be identified and transmitted separately, and the data format can be uniform, which reduces the difficulty of the data processing of the entire Internet of Things. For the newly increased or decreased accessory supply devices, the sensor network platform can also ensure that the accessory supply devices can work normally.

When the present disclosure is used, the industrial Internet of Things for regulating an inventory of accessories and control methods may be combined. The situation of accessories storage and consumption corresponding to the accessory supply device may be obtained in real-time and the collection data may be uploaded in real-time by the data collector. Data processing and transmission may be performed separately based on the independent service platform and the independent management platform, and different data processing parameters may be set for different accessory supply devices, thereby regulating the inventories of the accessories of the different accessory supply devices, which can implement the Internet of Things model of unified data receiving and sending, classification processing, and transmission, the data processing amount being large and accurate.

It should be noted that the user platform in this embodiment may be desktop computers, tablet computers, laptop computers, mobile phones, or other electronic devices that may realize data processing and data communication, which is not limited here. In specific applications, the first server and the second server may use a single server or a server cluster, which is not limited here. It should be understood that the data processing process mentioned in this embodiment may be processed through the processor of the server, and the data stored on the server may be stored on the storage device of the server, such as hard disks and other memories. In specific applications, the sensor network platform may adopt multiple groups of gateway servers, or multiple groups of intelligent routers, which are not limited here. It should be understood that the data processing process mentioned in the embodiments of the present disclosure may be processed through the processor of the gateway server, and the data stored in the gateway server may be stored on the storage device of the gateway server, such as hard disk, SSD, and other memories.

Further explanation, in the industrial Internet of Things for regulating an inventory of accessories, the service platform and the management platform both use a plurality of (the same number) sub-platforms to form an independent arrangement, and the plurality of the sub-platforms of the two platforms form a corresponding subordinate relationship. Each group of the corresponding management sub-platform and the corresponding service sub-platform correspond to the accessory supply device with the same number, so that the separate data processing, transmission, and storage of different accessory supply devices can be achieved. It not only reduces the overall data processing, transmission, and storage capacity of the service platform and management platform, but also avoids data errors when the data of different accessory supply devices is separately performed, and data source is clear. It can also ensure the independent security control of the accessory supply devices. The sensor network platform adopts the centralized arrangement, which can ensure uniform coordination and receiving and sending all the data that interacts with the accessory supply devices.

In some embodiments, the accessory supply devices are supply devices of the accessories in the intelligent manufacturing devices of the product manufacturing. Taking mechanical products as an example, accessory supply devices may be conveying devices or clamping devices of various accessories such as sealing rings, foot pads, end covers, bolts, etc., which are used to directly transport the accessories to intelligent manufacturing devices, or transmit to the corresponding conveyor belt for transportation. Taking a membrane gas meter as an example, the accessory supply devices may be conveying devices or clamping devices of various accessories such as an upper case, a lower case, a connector, an inner air pipe, a distribution of the gate, a slide valve, a membrane, etc., which are used to directly transport the accessories to intelligent manufacturing devices, or transmit to the corresponding conveyor belt for transportation. Correspondingly, the data collector is used to collect the corresponding data of the accessories, such as a counter for collecting the amount of inventory accessories, a piece counter and a timer for obtaining the average rate of accessory supply, etc.

In some embodiments, the different management sub-platforms receive the different accessory supply data, after data processing, store and send at least one processing result data to different service sub-platforms in the service platform, specifically including follow operations.

The management sub-platforms at least extract the amounts of the inventory accessories as first basic data after receiving the accessory supply data of the accessory supply devices corresponding to the numbers.

The management sub-platforms compare the first basic data with the demand amounts of the accessories in the management sub-platforms, judge whether the inventory of the accessories of the corresponding accessory supply device is sufficient, output comparison data and a judgment result, and sending the comparison data and the judgment result as the processing result data to the corresponding service sub-platforms. The demand amount of the accessories may be the amount required by accessories based on the normal use and loss of the accessory in the actual use process.

The present disclosure obtains the quantitative relationship between the amount required by accessories in the use process and the amount of the inventory in real time based on the amount of inventory accessories obtained as the first basic data and the comparison result with the demand amount of accessories in the management sub-platform. Then it is detected and judged whether the inventory of the accessories of the corresponding accessory supply device is sufficient in real-time, that is, corresponding operations may be executed based on the judgment result to meet the real-time changing demands of accessories.

It should be noted that the demand amount of the accessories may be determined by the normal use amount of the accessories and the loss amount of the accessories collected in real-time in the intelligent manufacturing device during the use of the accessories. The loss amount of the accessories may be an amount of the accessories that cannot be unavailable due to reasons such as accessories unqualified, damaged, dropped, unable to be captured, or the like. For example, when obtaining the demand amount of the accessories, if a piece of accessories is used normally, the amount of the initial inventory accessories of the accessory supply device may be reduced by 1; if a piece of accessories is loss, the amount of the initial inventory accessories of the accessory supply device may be added by 1, thereby the demand amount of the accessories in the actual production process is obtained. For more content about determining the demand amount of the accessories, please see FIGS. 3-5 and their related descriptions.

In specific applications, the management sub-platforms compare the first basic data with the demand amounts of the accessories pre-stored in the management sub-platforms and judge whether the inventory of the accessories of the corresponding accessory supply device is sufficient, specifically includes follow operations.

The management sub-platforms obtain a difference of accessories by subtracting the demand amount of the accessories from the first basic data and retain a positive or negative symbol of the difference of the accessories.

The management sub-platforms judge that the inventory of the accessories of the accessory supply device is sufficient at this time based on the difference of the accessories being positive, and use the difference of the accessories and the judgment result as the processing result data.

The management sub-platforms judge that the inventory of the accessories of the accessory supply device is insufficient at this time based on the difference of the accessories being negative, and use the difference of the accessories and the judgment result as the processing result data.

During the production process, the demand amount of the accessories may be greater than the amount of the current inventory accessories due to the abnormal loss of the accessories. Therefore, when the difference of the accessories is positive, it means that the current amount of the inventory accessories may meet the actual demand of the current accessories (that is, the demand amount of the accessories), so it may judge that the inventory of the accessories of the accessory supply device is sufficient at this time. When the difference of the accessories is negative, it means that the current demand of the inventory accessories cannot meet the actual demand of the current accessories, then it may judge that the inventory of the accessories of the accessory supply device is insufficient at this time, thereby using the difference of the accessories with a negative symbol as one of the processing result data to facilitate the subsequent supply of the same amount of accessories.

In the actual production process, the above method may determine the relationship between the current inventory of the accessories and the current demand amount of the accessories, thereby regulating the current accessories. However, when a long time and large-scale production task is carried out, the above method cannot completely determine whether the accessories in an entire working time can meet the needs of the working time according to the whole working hours, and there is a situation that after the accessories are used up within the remaining working time, there is no timely deployment compensation, thereby resulting in stopping work and production. In addition, because the demand amount of the accessories in each time period of real-time data collection is different, it may cause that the judgment of the current data has an error, and the accessories deployment cannot be performed in time.

Based on this, in some embodiments, the different management sub-platforms receive the different accessory supply data, and after data processing, store and send the processing result data to the different service sub-platforms, specifically including follow operations.

The management sub-platforms extract the average rate of the accessory supply in the accessory supply data simultaneously after receiving the accessory supply data of the accessory supply devices corresponding to the numbers.

The management sub-platforms calculate the average rate of the accessory supply and remaining production working time in the corresponding management sub-platforms to obtain calculation results as second basic data; and the remaining production working time is remaining total time that the corresponding accessory supply devices need to be supplied.

The management sub-platforms perform a difference operation between the second basic data and the first basic data to obtain a data difference, and retain a positive or negative symbol.

The management sub-platforms cover the first basic data by the second basic data based on the data difference being positive, and perform a comparison and a judgment by the second basic data and the demand amounts of the accessories.

The management sub-platforms delete the second basic data based on the data difference being negative, and perform a comparison and a judgment by the first basic data and the demand amounts of the accessories directly.

In this method, it may obtain the average demand amount of the accessories in the total remaining production working time based on the product calculation of the average rate of the accessory supply and the remaining production working time. For example, the average rate of accessory supply is 2/minute, and the remaining production working time is 200 minutes, the demand amount of the accessories in the remaining production working time is 400, and the second basic data is 400. At this time, after calculating the second basic data with the first basic data, the demand amount of the accessories in the total remaining production working time may be compared and judged to regulate the accessories based on the total production working time.

In some embodiments, after parsing the first instruction, the corresponding management sub-platform generates a second instruction recognized by the accessory supply devices based on the processing result data, and sends the second instruction to the sensor network platform, specifically including follow operations.

The user platform generates a process end instruction correspondingly as the first instruction when the difference of the accessories is positive; after parsing the first instruction, the corresponding management sub-platform deletes the stored processing result data, and stops sending the second instruction.

The user platform generates an accessory supply instruction correspondingly as the first instruction when the difference of the accessories is negative; after parsing the first instruction, the corresponding management sub-platform uses an absolute value of the difference of the accessories as supply amount data, and generates the second instruction after performing a data processing on the supply amount data, the corresponding accessory supply device executes the operation of the accessory supply based on the supply amount data in the second instruction.

It should be noted that using the absolute value of the difference of the accessories as the supply amount data is obtained by calculating the real-time data. In order to fully meet the demand, in practical applications, the supply amount data may also be a certain value larger than the absolute value of the accessories difference, so that the accessories after the supply of the supply may have a margin. For example, after parsing the first instruction, the management sub-platform corresponding to the management platform may take the absolute value of the accessories difference to multiply by 1.1-1.2 as the supply amount data, which can cope with some situations of the non-normal consumption of the accessories.

For further explaining, the operation of the accessory supply of the accessory supply device mainly includes issuing an accessory regulating command to regulate the accessories, issuing a supply signal to the other supporting accessory supply devices, issuing an alarm signal to prompt accessory supply, etc.

In some embodiments, when the first instruction further includes the time of executing the accessory supply, the management sub-platform writes the time of executing the accessory supply into the second instruction after parsing the first instruction.

After receiving the second instruction, the corresponding accessory supply device extracts the time of executing the accessory supply and executes the operation of the accessory supply at the time of executing the accessory supply.

Figure 2:
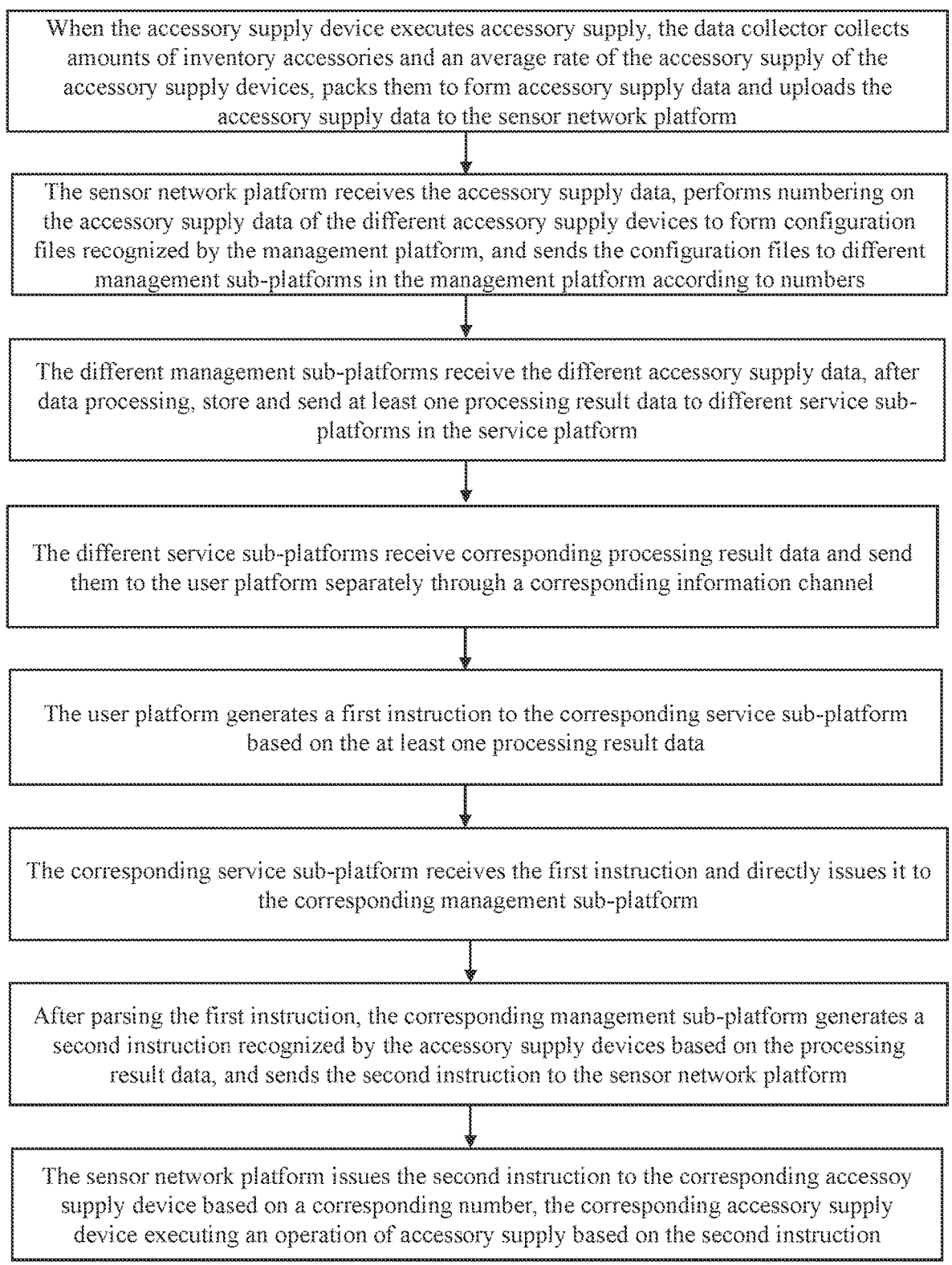
FIG. 2 is a flowchart illustrating a control method for the industrial Internet of Things for regulating an inventory of accessories according to some embodiments of the present disclosure.

FIG. 2 is a flowchart illustrating a control method for the industrial Internet of Things for regulating an inventory of accessories according to some embodiments of the present disclosure. As shown in FIG. 2, the second embodiment of the present disclosure provides a control method for an industrial Internet of Things for regulating an inventory of accessories, the industrial Internet of Things for regulating an inventory of accessories comprises a user platform, a service platform, a management platform, a sensor network platform, and an object platform interacting in sequence.

The service platform and the management platform both use an independent arrangement, and the sensor network platform uses a centralized arrangement. The independent arrangement means that the service platform or management platform uses different sub-platforms to store, process, and/or transmit data of different object platforms. The centralized arrangement means that the sensor network platform uniformly receives data, uniformly processes data, and uniformly sends data. The object platform is configured to include different accessory supply devices, each of which is configured with a data collector.

The control method includes: when the accessory supply devices execute accessory supply, collecting amounts of inventory accessories and an average rate of the accessory supply of the accessory supply devices, packing the amounts of inventory accessories and the average rate of the accessory supply of the accessory supply device to form accessory supply data and uploading the accessory supply data to the sensor network platform by the data collector, receiving the accessory supply data, performing numbering on the accessory supply data of the different accessory supply devices to form configuration files recognized by the management platform, and sending the configuration files to different management sub-platforms in the management platform according to numbers by the sensor network platform; receiving the different accessory supply data, after data processing, storing and sending at least one processing result data to different service sub-platforms in the service platform by the different management sub-platforms; receiving corresponding processing result data and sending them to the user platform separately through a corresponding information channel by the different service sub-platforms, generating a first instruction to a corresponding service sub-platform based on the at least one processing result data by the user platform; receiving the first instruction and directly issues it to a corresponding management sub-platform by the corresponding service sub-platform, after parsing the first instruction, generating a second instruction recognized by the accessory supply devices based on the processing result data, and sending the second instruction to the sensor network platform by the corresponding management sub-platform; and issuing the second instruction to a corresponding accessory supply device based on a corresponding number by the sensor network platform, executing an operation of accessory supply based on the second instruction by the corresponding accessory supply device.

Figure 3:
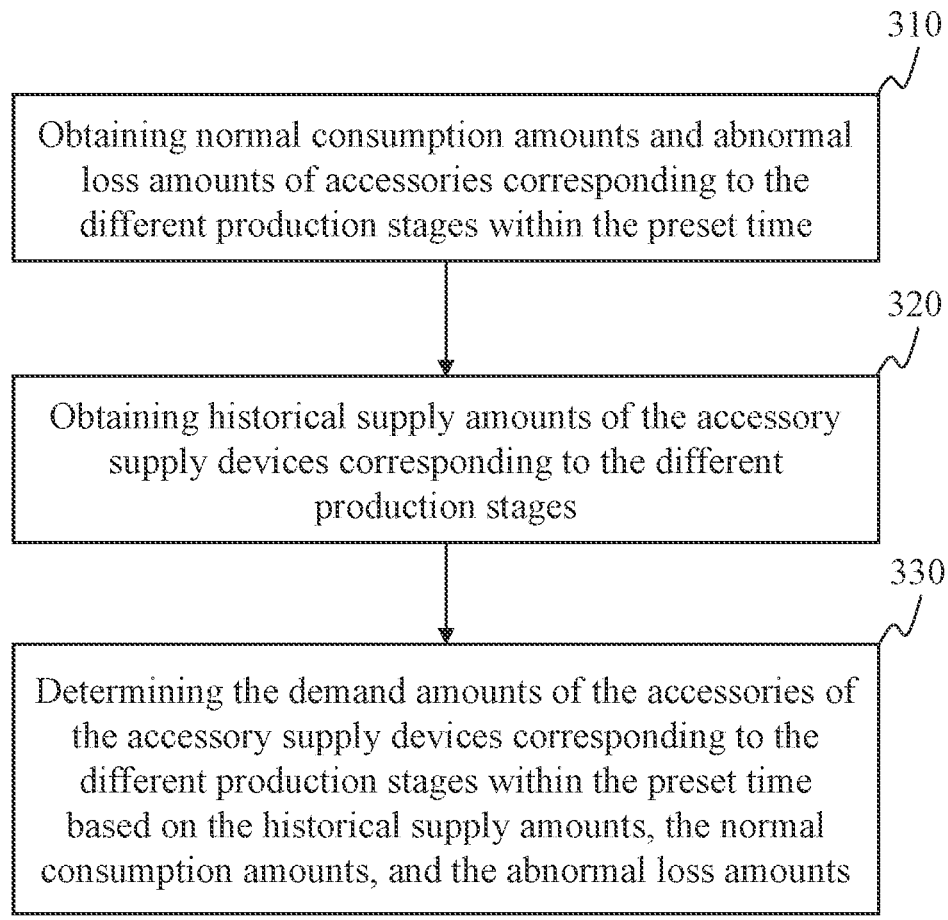
FIG. 3 is a flowchart illustrating an exemplary process for determining the demand amounts of the accessories according to some embodiments of the present disclosure.

FIG. 3 is a flowchart illustrating an exemplary process for determining the demand amounts of the accessories according to some embodiments of the present disclosure. In some embodiments, the method for determining the demand amount of accessories may be performed by the management platform in the industrial Internet of Things for regulating an inventory of accessories. For example, the method for determining the demand amount of accessories may be stored in the storage device in a form of a program or an instruction. When the management platform executes the program or the instruction, the process 300 may be achieved. The operation diagram of the process 300 presented is used to illustrate. In some embodiments, one or more additional operations without descriptions and/or one or more operations without discussions may be used to complete the process. In addition, the order of the operations of process 300 described in FIG. 3 is not restricted.

Step 310, obtaining normal consumption amounts and abnormal loss amounts of accessories corresponding to the different production stages within the preset time.

The preset time may refer to a time period set in advance. In some embodiments, the preset time may be a time period in the future, for example, one hour for production time in the future. It may also be a time period from a certain time point in the past to the current time point, for example, the current time point is 16:00, and the preset time may be a time period from 15:30 to 16:00. In some embodiments, the preset time may correspond to the production stage. For example, the preset time may be a time period of the production stage of assembling meter core.

The normal consumption amount may refer to a consumption amount generated by the normal assembly of the accessories in the assembly stage. For example, in the slide valve assembly stage, the assembly device has assembled 100 slide valves normally in a period of time, and the normal consumption amount of the slide valve during this period of time is 100.

The abnormal loss amount may refer to the abnormal loss amount of the accessories in each production stage. For example, the abnormal loss amount may be an amount of the accessories that cannot be unavailable normally due to reasons such as accessories unqualified, damaged, dropped, unable to be captured, and or the like. For example, within a period of time, in the upper case assembly stage, 3 upper cases are accidentally dropped, and in the slide valve assembly stage, 2 assembled upper cases are accidentally damaged, so the abnormal loss amount of the upper case accessory within the time period is 5.

In some embodiments, the object platform may also include a sampling detection device, which may be used to detect the finished products of each production stage. For example, the sampling detection device may be used to detect whether the finished product is qualified, and determine the number of qualified finished products.

In some embodiments, the normal consumption amount may be determined based on the sampling detection device. Specifically, the amount of qualified finished products may be determined by the counter of the sampling detection device, thereby determining the normal consumption amount. For example, the counter of the sampling detection device determines that the amount of qualified finished products in finished product A is 200, an amount of the accessory B for assembling finished products A is 2, then the normal consumption amount of the accessories may be determined as 400. For another example, 50 samples are sampled and detected from 1000 finished products A, the amount of qualified finished products is 45, and the amount of qualified finished products corresponding to the amount of total finished products may be determined as 900 (e.g., 0.9×1000=900) according to the qualification rate (e.g., 0.9), the amount of accessory B for assembling finished products A is 2, then the normal consumption amount of the accessories may be determined as 1800.

In some embodiments, the abnormal loss amount of the accessories may be determined by counting the loss amount of accessory supply in one or more time periods of each production stage based on historical production data of each production stage. The historical production data may refer to historical data related to the use situation of accessories in each production stage. For example, the amount of the accessories that cannot be used due to reasons such as accessories unqualified, damaged, dropped, unable to be captured, and or the like may be counted as an abnormal loss amount based on the data of each time of accessory supply in the historical production data. In some embodiments, the historical production data may be determined based on the monitoring video of each production stage, or it may also be determined based on production records. For example, for a period of time, the historical production data shows that in the slide valve assembly stage, 8 slide valves cannot be captured due to accidents, in the membrane assembly stage, 2 slide valves are damaged due to accidents, then the abnormal loss amount of the slide valve within this time period is 10.

Step 320, obtaining historical supply amounts of the accessory supply devices corresponding to the different production stages.

The historical supply amount may refer to the amount of accessories that the accessory supply device supplies. In some embodiments, the historical supply amount may be the amount of accessories supplied at a plurality of historical time points, or the amount of accessories supplied when producing a batch of products. In some embodiments, the historical supply amount may be determined based on the work log of the accessory supply device.

Step 330, determining the demand amounts of the accessories of the accessory supply devices corresponding to the different production stages within the preset time based on the historical supply amounts, the normal consumption amounts, and the abnormal loss amounts.

The demand amount of the accessories may refer to the total amount of the accessories that the accessory supply device needs to supply to achieve the production target within a preset time. The demand amount of the accessories is used to meet the accessories demand notch due to normal consumption or abnormal loss.

In some embodiments, the management platform may determine the proportion of accessories of abnormal loss based on the historical supply amount of a plurality of historical time points and may determine the abnormal loss rate of accessories based on the average value of a plurality of proportions of accessories of abnormal loss. The abnormal loss rate may refer to the ratio of the abnormal loss amount of the accessories to the total supply amount of the accessories. For example, it may determine the abnormal loss rate based on a process of single accessory supply, the abnormal loss amount of accessory A is 22, and the corresponding historical supply amount is 1100, the abnormal loss rate of accessory A may be determined by 2%. As another example, the abnormal loss rate may be determined based on the average value of the ratios of the abnormal loss amounts to the historical supply amounts in a plurality of processes of accessory supply. For example, during 4 processes of accessory supply, the abnormal loss rates of accessories B are 2.1%, 1.9%, 2.2%, and 2.0% respectively, and the average value of 2.05% may be used as the final abnormal damage loss rate of accessory B.

In some embodiments, the management platform may determine the demand amount of the accessories based on the abnormal loss rate of the accessories. Merely by way of example, the demand amount of the accessories may be calculated through the following equation (1):

$$M=(1+k)\times N,$$

where M denotes the demand amount of the accessories, K denotes the abnormal loss rate, and N denotes the historical supply amount. For example, if the historical supply amount of accessory A is 100 and the abnormal loss rate is 0.05, then the demand amount of the accessories may be determined as 105.

In some embodiments of the present disclosure, the abnormal loss rate is considered to determine the demand amount of the accessories, which may reflect the loss situation of various accessories in the production process and may provide different supply solutions for the different accessory supply devices to fill the more subsequent accessories demand notch that may be generated caused by abnormal losses. At the same time, the abnormal loss rate may be determined by taking the average value of proportions of accessories loss during a plurality of accessory supply processes, which can reduce the accidental error caused by a single statistical data, and can make the value of the abnormal loss rate more accurate, causing that the demand amount of the accessories can be more accurate.

It should be noted that the descriptions of the relevant process 300 is merely for example and description, without limiting the scope of the present disclosure. The process 300 may be made various modifications and changes by those skilled in the art under the guidance of the present disclosure. However, these modifications and changes are still within the scope of the present disclosure.

Figure 4:
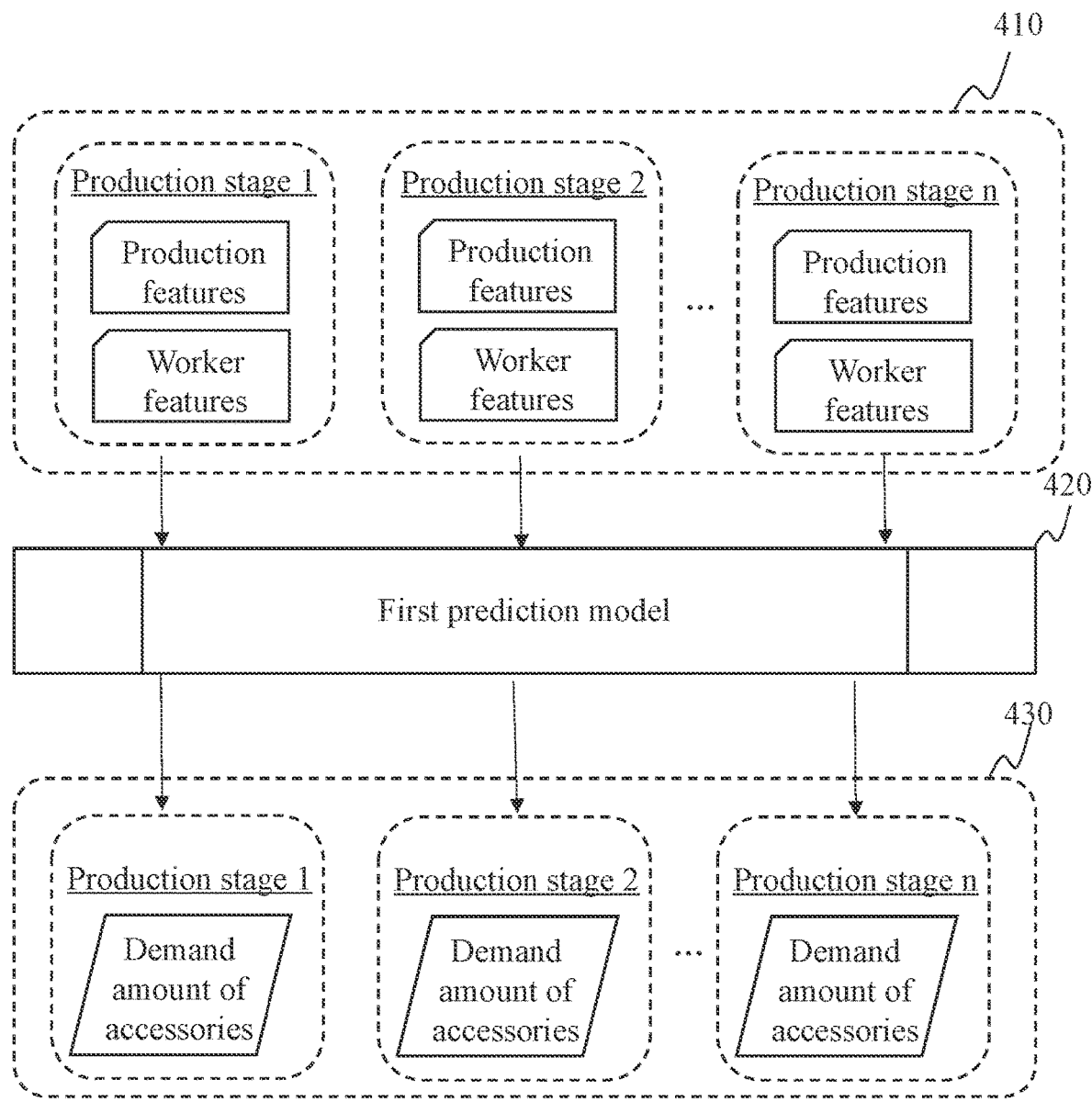
FIG. 4 is a schematic diagram illustrating an exemplary process for determining the demand amounts of the accessories based on a first prediction model according to some embodiments of the present disclosure.

FIG. 4 is a schematic diagram illustrating an exemplary process for determining the demand amounts of the accessories based on a first prediction model according to some embodiments of the present disclosure.

In some embodiments, the management platform may obtain production features and worker features of each production stage and process the production features and the worker features based on a first prediction model to determine the demand amounts of the accessories of the different accessory supply devices within the preset time.

As shown in FIG. 4, the model input 410 may include production features and worker features of each production stage (such as production stage 1. production stage 2 . . . , production stage n).

The production stage may refer to a series of stages in a production process of a product. In some embodiments, the production stage may include but not limited to accessories production, accessories assembly, and product detection. For example, on the production line of accessories assembly of the membrane gas meter, the production stages may include an upper case assembly stage, a lower case assembly stage, a connector assembly stage, an inner air pipe assembly stage, the distribution of the gate assembly stage, a slide valve assembly stage, a membrane assembly stage, etc.

The production features may refer to features related to a production situation of a production stage. In some embodiments, the production features may include but not limited to the performance and parameters, production speed, production complexity degree, etc., of the production device. The production speed may refer to the speed of production device assembly and accessories detection. For example, in the membrane assembly stage, the membrane assembly device may assemble 10 pieces membrane accessories per minute, and the production speed of the membrane assembly device is 10 pieces/min. In some embodiments, the production speed may include a real-time production speed and a predictive production speed, predictive production speed may be the production speed of the future time obtained by predicting. It is worth noting that the production speed may affect the demand amounts of accessories in different production stages. For example, during a production cycle of a production stage, when the production speed becomes slower, the demand amount of the accessories may be reduced accordingly. In some embodiments, the predictive production speed may be determined based on a model. For more contents about determining the predictive production speed, please see below contents.

The production complexity degree may refer to the complexity degree of the production process. In some embodiments, the production complexity degree of different products may be different. For example, the upper case assembly and the lower case assembly are more complicated than the membrane assembly. In some embodiments, the real value between 0-1 may be used to represent the production complexity degree. For example, the production complexity degree of the upper case assembly and the lower case assembly may be 0.6, and the production complexity degree of the membrane assembly may be 0.2.

In some embodiments, the production features may be obtained based on manufacturers of production devices, monitoring videos of production processes, and the judgment of experts based on experience, etc.

The production process requires the participation of workers. For example, workers may perform the necessary operations on the device, place the products on the assembly line, etc. Correspondingly, the worker features may refer to the features when the workers perform production operations in the production stage. In some embodiments, worker features may include but not limited to the proficiency and work quality of workers. The production process also requires the participation of workers. For example, workers may perform the necessary operations on the device, place the products on the assembly line, etc. The proficiency of workers may be determined based on work efficiency. For example, different workers use the same production device in the same production stage, but the amount of output of the final product may be different. The work efficiency of the worker with a higher output under the same conditions is higher. Correspondingly, it may be considered that the proficiency of this worker is higher. The work quality of workers may be determined based on the work score.

In some embodiments, the first prediction model 420 may be used to deal with the production features and worker features of each production stage to obtain the demand amount of the accessories in each production stage. Correspondingly, the model output 430 may include the demand amount of the accessories of the accessory supply devices corresponding to different production stages (such as production stage 1, production stage 2 . . . , production stage n). It is worth noting that because the types of accessories required by different production stages for production activities are different, and the demand amounts of different types of accessories are different, correspondingly, each production stage may correspond to one or more accessory supply devices, the one or more accessory supply devices may perform accessory supply at the corresponding production stage. In some embodiments, the demand amount of the accessories of the accessory supply device corresponding to the different production stages output by the model may include the demand amount of the accessories corresponding to one or more accessory supply devices corresponding to each production stage. For example, production stage 1 includes accessory supply device A and accessory supply device B, and production stage 2 includes accessory supply device C. Correspondingly, the production features and the worker features of production stage 1 and the production features and the worker features of the production stage 2 are input into the first prediction model. The output of the model may include the demand amount of the accessories of the accessory supply device A and the demand amount of the accessories of the accessory supply device B in the production stage 1, and the demand amount of the accessories of the accessory supply device C in the production stage 2.

In some embodiments, the first prediction model 420 may be a deep learning model, such as a Transformer model.

The parameters of the first prediction model may be obtained by training. In some embodiments, the first prediction model may be trained by a plurality of training samples with labels. For example, the plurality of training samples with labels may be input into the initial first prediction model, and a loss function may be constructed based on the labels and the results of the initial first prediction model. The parameters of the first prediction model are updated based on the iteration of the loss function. The module training is completed when the first predictive model meets the preset condition and the first prediction model may be obtained. The preset conditions may be that the loss function is convergence, the count of the iteration reaches a threshold, or the like.

In some embodiments, the training samples may include sample production features and sample worker features of the sample production stage. The labels may be the demand amount of the accessories in the sample production stage. In some embodiments, the training samples may be obtained based on the production data of each historical time period, and the labels may be obtained by manual labeling.

In some embodiments of the present disclosure, production features may be input into the first prediction model, which can fully consider the impact of production conditions on the demand amount of the accessories, thereby accurately determining the demand amount of the accessories. At the same time, the worker features are related to the production speed of the production line, and further related to the demand amount of the accessories. The prediction may be more accurate by introducing the person's factors in the input of the model.

In some embodiments, the first prediction model may also be used to determine the production speed. When the production features, which are input into the first prediction model, include a real-time production speed of each production stage, the output of the first prediction model may also include the predictive production speed of the target production stage. Correspondingly, during training, the first prediction model may use the production speed of each production stage within the multiple groups of historical preset cycles as training samples and labels to train the first prediction model.

In some embodiments of the present disclosure, the production speed of the target production stage may be predicted by processing the real-time production speed of each production stage through the model, which may fully consider the mutual impact of the production speed of each production stage, thereby accurately predicting the production speed of the target production stage. At the same time, the demand amount of the accessories may be further regulated based on the predictive production speed, so that the demand amount of the accessories can meet the production speed of the target production stage, and the situation of supply redundancy can be effectively avoided.

Figure 5:
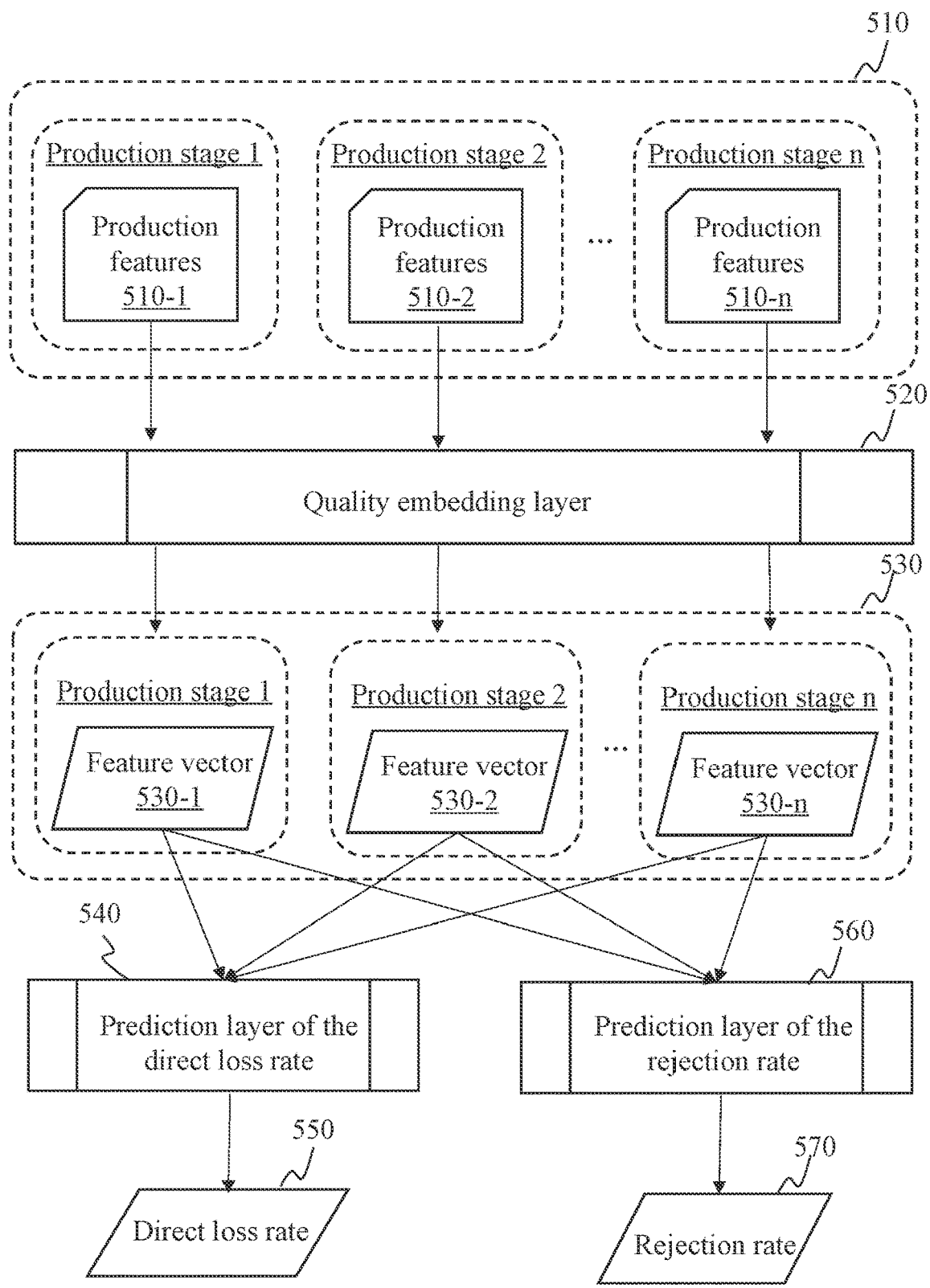
FIG. 5 is a schematic diagram illustrating an exemplary process for determining the demand amounts of the accessories based on the direct loss rate and the rejection rate according to some embodiments of the present disclosure.

FIG. 5 is a schematic diagram illustrating an exemplary process for determining the demand amounts of the accessories based on the direct loss rate and the rejection rate according to some embodiments of the present disclosure.

In some embodiments, the management platform may obtain the direct loss rate of accessories in each production stage, and obtain the rejection rate in each production stage. Furthermore, the management platform may determine the demand amounts of the accessories of the accessory supply devices corresponding to the different production stages within the preset time based on the direct loss rate and the rejection rate.

The direct loss rate may refer to the abnormal loss rate of the accessories in the assembly stage. For example, in the lower case assembly stage, the amount of the lower case that cannot be captured by the assembly device because of an accident is 1, in addition, there is no abnormal loss, in this stage, the accessory supply device supplies 100 lower cases, then the direct loss rate of the lower case assembly stage is 1%.

In some embodiments, the management platform may input the production features of each production stage into a quality embedding layer to obtain feature vectors of each production stage. The management platform may input the feature vectors of a single production stage into the prediction layer of the direct loss rate to obtain the direct loss rate of the production stage.

As shown in FIG. 5, the input 510 of the quality embedding layer 520 may include the production features 510-1 of the production stage 1, the production features 510-2 of the production stage 2, . . . , the production features 510-n of the production stage n. The output 530 of the quality embedding layer 520 may include the feature vector 530-1 of the production stage 1, the feature vector 530-2 of the production stage 2, . . . , the feature vector 530-n of the production stage n.

In some embodiments, the management platform may input the production features 510-1 of the production stage 1, the production features 510-2 of the production stage 2, . . . , the production features 510-n of the production stage n (i.e., input 510) to quality embedding layer 520 to obtain the feature vector 530-1 of the production stage 1, the feature vector 530-2 of the production stage 2, . . . , the feature vector 530-n of the production stage n (i.e., output 530). Further, the management platform may input the feature vector of one of the production stages in the output 530 of the quality embedding layer 520 to the prediction layer 540 of the direct loss rate to obtain the direct loss rate 550 of the production stage. For example, taking production stage 1 as an example, the feature vector 530-1 of the production stage 1 is input into the prediction layer 540 of the direct loss rate to obtain the direct loss rate of the production stage 1.

The quality embedding layer 520 may be used to determine the feature vectors corresponding to the production features of the production stage. In some embodiments, when the input 510 of the quality embedding layer 520 is a production feature of a single production stage, the output 530 of the quality embedding layer 520 is a feature vector of the single production stage. When the input 510 of the quality embedding layer 520 is production features of a plurality of production stages, the output 530 of the quality embedding layer 520 is feature vectors of the plurality of production stages.

In some embodiments, the quality embedding layer 520 may be a deep learning model, such as a CNN model.

The prediction layer 540 of the direct loss rate may be used to determine the direct loss rate of production stages. In some embodiments, when the input of the prediction layer 540 of the direct loss rate is a feature vector of a single production stage, the output of the prediction layer 540 of the direct loss rate is a direct loss rate of the single production stage. When the input of the prediction layer 540 of the direct loss rate is feature vectors of a plurality of production stages, the output of the prediction layer 540 of the direct loss rate is corresponding direct loss rates of the plurality of production stages.

In some embodiments, the prediction layer 540 of the direct loss rate may be a deep learning model, such as a NN model, a DNN model, etc.

In some embodiments, the quality embedding layer and the prediction layer of the direct loss rate may be obtained through joint training. For example, training samples may be input into the quality embedding layer to obtain the feature vector of the sample production stage output by the quality embedding layer. Then the output of the quality embedding layer is used as the input of the prediction layer of the direct loss rate to obtain the direct loss rate of the sample production stage output by the prediction layer of the direct loss rate. During the training process, a first loss function may be constructed based on the labels and the outputs of the prediction layer of the direct loss rate to update the parameters of the model. When the training model meets the preset conditions, the training is over, and the trained quality embedding layer and the trained prediction layer of the direct loss rate are obtained.

In some embodiments, the training samples may be the historical production data with labels of at least one sample production stage. The historical production data include the production features of the sample production stage. The training labels may be the actual direct loss rate of the at least one production stage, and the actual direct loss rate may be obtained based on the historical production data statistics.

The rejection rate may refer to the damage rate of semi-finished products caused by adding accessories of this production stage to the semi-finished products of the previous production stage in the production stage. For example, the production line transports 240 semi-finished products without lower cases to the lower case assembly stage, in the lower case assembly stage, 3 semi-finished products without assembling lower cases are accidentally damaged, so the rejection rate of the lower case assembly stage is 1.25%. The rejection rate may reflect the accessories demand impact of this production stage to the preliminary process.

In some embodiments, the management platform may input the feature vectors of each production stage in the prediction layer of the rejection rate of the corresponding production stage to obtain the rejection rate of the corresponding production stage. The feature vectors of each production stage are the output 530 of the above quality embedding layer 520.

As shown in FIG. 5, the output 530 of the quality embedding layer 520 may be used as the input of the prediction layer 560 of the rejection rate, that is, the input of the prediction layer 560 of the rejection rate includes at least one of the feature vector 530-1 of the production stage 1, the feature vector 530-2 of the production stage 2, . . . , and the feature vector 530-n of the production stage n. The output of the prediction layer 560 of the rejection rate is the rejection rate 570 of the corresponding production stage.

In some embodiments, the management platform may input the production features 510-1 of the production stage 1, the production features 510-2 of the production stage 2, . . . , the production features 510-n of the production stage n (i.e., input 510) to quality embedding layer 520 to obtain the feature vector 530-1 of the production stage 1, the feature vector 530-2 of the production stage 2, . . . the feature vector 530-n of the production stage n (i.e., output 530). Further, the management platform may input the feature vector of one of the production stages in the output 530 of the quality embedding layer 520 to the prediction layer 560 of the rejection rate to obtain the rejection rate 570 of the production stage. For example, taking production stage 1 as an example, when the feature vector 530-1 of the production stage 1 is input into the prediction layer 560 of the rejection rate, the rejection rate of the production stage 1 may be obtained.

The prediction layer 560 of the rejection rate may be used to determine the rejection rate of the production stage. In some embodiments, the input of the prediction layer 560 of the rejection rate is a feature vector of a single production stage, and the output of the prediction layer 560 of the rejection rate is the rejection rate of the production stage. When the input of the prediction layer 560 of the rejection rate is the feature vectors of a plurality of the production stages, the output of the prediction layer 560 of the rejection rate is the rejection rate corresponding to the plurality of production stages.

In some embodiments, the prediction layer 560 of the rejection rate is a deep learning model, such as a Transformer model.

In some embodiments, the quality embedding layer and the prediction layer of the rejection rate may be obtained through joint training.

For example, training samples may be input into the quality embedding layer to obtain the feature vector of the sample production stage output by the quality embedding layer. Then the output of the quality embedding layer is used as the input of the prediction layer of the rejection rate to obtain the rejection rate of the sample production stage output by the prediction layer of the rejection rate. During the training process, a second loss function may be constructed based on the labels and the outputs of the prediction layer of the rejection rate to update the parameters of the model. When the training model meets the preset conditions, the training is over, and the trained quality embedding layer and the trained prediction layer of the rejection rate are obtained.

In some embodiments, the training samples may be the historical production data with labels of at least one production stage. The training labels may be the actual rejection rate of the at least one production stage, and the actual rejection rate may be obtained based on historical production data statistics.

In some embodiments, the training process of the quality embedding layer, the prediction layer of the direct loss rate, and the prediction layer of the rejection rate may perform jointly. In the early stage of training, the weight of the first loss function is larger when the embedding layer and the prediction layer of the direct loss rate perform joint training. Correspondingly, the training of the quality embedding layer and the prediction layer of the direct loss rate may be accelerated. In the later stage of training, the weight of the second loss function is larger when the embedding layer and the prediction layer of the rejection rate perform joint training. Correspondingly, the training of the prediction layer of the rejection rate may be accelerated.

In some embodiments of the present disclosure, the parameters of each model may be obtained through joint training, in some cases, it is conducive to solving the problem of labels hard to obtain when training the quality embedding layer separately. It can also make the quality embedding layer better reflect the production features of the production stage, which is conducive to more accurately determining the direct loss rate and rejection rate of the production stage, and further, it is conducive to deal with the adverse effects of loss and reject on accessory supply.

At the same time, due to the complicated of the prediction layer of the rejection rate (Trans Former model), the weight of the first loss function and the second loss function during the training process may be regulated, the weight of the first loss function is increased in the early stage of training to accelerate the training of the quality embedding layer and the prediction layer of the direct loss rate; and the weight of the second loss function is increased in the later stage of training to accelerate the training of the prediction layer of the rejection rate. During the training process, joint training is performed on the quality embedding layer, the prediction layer of the direct loss rate, and the prediction layer of the rejection rate based on weight adjustment, the trained quality embedding layer, the trained prediction layer of the direct loss rate, and the trained prediction layer of the rejection rate can be more accurate when accelerating the training process.

In some embodiments, the management platform may determine the demand amounts of the accessories of the accessory supply devices corresponding to the different production stages within the preset time based on the direct loss rate and the rejection rate determined above.

Merely by way of example, the demand amount of the accessories may be calculated through the following equation (2):

$$M = (1+a+b) \times N,$$

where M denotes the demand amount of the accessories, N denotes the historical supply amount, a denotes the direct loss rate, and b denotes the rejection rate. For example, if the historical supply amount of accessory A in a certain production stage is 1000, the direct loss rate of this stage is 3%, and the rejection rate is 1%, then the demand amount of accessory A may be determined as 1040.

In some embodiments of the present disclosure, predicting the demand amount of accessories in each production stage based on the direct loss rate and rejection rate can avoid tedious and miscellaneous data statistics, making the accessories regulation process more intelligent and efficient.

In some embodiments, the management platform may further process the demand amount of the accessories and the first basic data obtained predictively based on preset rules to determine the predicted supply time for accessory supply. The first basic data is the amount of inventory accessories, and the predicted supply time may be the time interval for the next supply.

Merely by way of example, the predicted supply time may be calculated through the following equation (3):

$$t' = \frac{M}{D} \times t \times i,$$

where t' denotes the predicted supply time, M denotes the demand amount of the accessories, D denotes the amount of inventory accessories, t denotes the length of the preset time, and i denotes the preset coefficient.

Exemplarily, the preset time t is within the next 60 minutes, the demand amount M of the accessories is 120, the amount D of inventory accessories is 80, i is preset as 0.8, and the predicted supply time may be determined as 32 minutes, then after 32 minutes, the supply may be performed, and the amount of supply is the demand amount of accessories.

In some embodiments of the present disclosure, the time point of the accessory supply is predicted according to the actual production situation of each production stage on the production line to perform the accessory supply at the predicted supply time, which can maximize the production capacity of the production line and effectively avoid the occurrence of a production stop due to insufficient accessories.

The basic concepts have been described above, apparently, for those skilled in the art, the above-mentioned detailed disclosure is only used as an example, and it does not constitute a limitation of the present disclosure. Although there is no clear explanation here, those skilled in the art may make various modifications, improvements, and corrections for the present disclosure. Such modifications, improvements, and corrections are suggested in the present disclosure, so such modifications, improvements, and corrections still belong to the spirit and scope of the exemplary embodiments of the present disclosure.

Meanwhile, the present disclosure uses specific words to describe the embodiments of the present disclosure. For example, "one embodiment," "an embodiment," and/or "some embodiments" mean that a certain feature, structure, or feature is connected with at least one embodiment of the present disclosure. Therefore, it should be emphasized and noted that two or more references of "an embodiment" or "one embodiment" or "an alternative embodiment" in various places in the present disclosure do not necessarily refer to the same embodiment. In addition, some features, structures, or features of one or more embodiments in this manual may be properly combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose of description and that the appended claims are not limited to the disclosed embodiments, on the contrary, are intended to cover modifications and equivalent combinations that are within the spirit and scope of the embodiments of the present disclosure. For example, although the implementation of various components described above may be embodied in a hardware device, it may also be implemented as a software only solution, e.g., an installation on an existing server or mobile device.

Similarly, it should be noted that to simplify the expressions disclosed in the present disclosure and thus help the understanding of one or more embodiments of the invention, in the foregoing description of the embodiments of this specification, various features may sometimes be combined into one embodiment, drawings or descriptions thereof. However, this disclosure method does not mean that the features required by the object of the present disclosure are more than the features mentioned in the claims. Rather, claimed subject matter may lie in less than all features of a single foregoing disclosed embodiment.

Some embodiments use numbers with description ingredients and attributes. It should be understood that the number described by such examples is used in some examples with the modified words "about", "approximate" or "generally" to modify. Unless otherwise stated, "about", "approximate" or "generally" indicates that the number allows a change of ±20%. Correspondingly, in some embodiments, the value parameters used in the present disclosure and claims are approximate values. The approximate values may be changed according to the features of individual embodiments. In some embodiments, the numerical parameters should consider the effective digits specified and use a general digit reservation method. Although in some embodiments of the present disclosure, the numerical domain and parameters used to confirm the range of its scope are approximate values, the setting of such values may be as precise as possible within the feasible range in specific embodiments.

For each patent, patent application, patent application publications and other materials cited by the present disclosure, such as articles, books, instructions, publications, documents, etc., all of them will be incorporated in the present disclosure as a reference. History application documents that are inconsistent or conflictive with the contents of the pre sent disclosure are excluded, as well as documents (currently or subsequently appended to the present disclosure) limiting the broadest scope of the claims of the present specification. It should be noted that, if there is any inconsistency or conflict between the descriptions, definitions, and/or usage of terms in subsidiary information of the present disclosure and the contents of the present disclosure, the descriptions, definitions, and/or usage of terms in the present disclosure shall prevail.

Finally, it should be understood that the embodiments described in the present disclosure are only used to illustrate the principle of the embodiments of the present disclosure. Other deformations are also possible within the scope of the present disclosure. Therefore, merely by way of example and not limitation, alternative configurations of the embodiments of the present disclosure may be considered consistent with the teachings of the present disclosure. Correspondingly, the embodiments of the present disclosure are not limited to the implementation and description of the present disclosure.

What is claimed is:

1. An industrial Internet of Things system for controlling a supply of accessories, comprising a user platform, a service platform, a management platform, a sensor network platform, and an object platform interacting in sequence, wherein the object platform is configured to include different accessory supply devices, each of which is configured with a data collector;

when each of the accessory supply device executes an operation of accessory supply:

the data collector collects amounts of inventory accessories and an average rate of the accessory supply of the accessory supply device, packs the amounts of inventory accessories and the average rate of the accessory supply of the accessory supply device to form accessory supply data and uploads the accessory supply data to the sensor network platform;

the sensor network platform receives the accessory supply data, performs numbering on the accessory supply data of the different accessory supply devices to form configuration files recognized by the management platform, and sends the configuration files to different management sub-platforms in the management platform according to numbers;

the different management sub-platforms receive the different accessory supply data, process the different accessory supply data, store and send at least one processing result data to different service sub-platforms in the service platform;

the different service sub-platforms receive corresponding processing result data and send the corresponding processing result data to the user platform separately through a corresponding information channel;

the user platform generates a first instruction to a corresponding service sub-platform based on the at least one processing result data;

the corresponding service sub-platform receives the first instruction and directly issues the first instruction to a corresponding management sub-platform;

the corresponding management sub-platform parses the first instruction, generates a second instruction recognized by the different accessory supply devices based on the at least one processing result data, and sends the second instruction to the sensor network platform;

the sensor network platform issues the second instruction to a corresponding accessory supply device based on a corresponding number; and the corresponding accessory supply device executing an operation of accessory supply based on the second instruction.

2. The industrial Internet of Things for controlling the supply of accessories of claim 1, wherein a count of the management sub-platforms is equal to a count of the service sub-platforms, and the management sub-platforms and the service sub-platforms correspond one-by-one, each group of the corresponding management sub-platforms and the corresponding service sub-platforms corresponding to the accessory supply device with a same number.

3. The industrial Internet of Things for controlling the supply of accessories of claim 1, wherein the different management sub-platforms receive the different accessory supply data, and after data processing, store and send the at least one processing result data to the different service sub-platforms including:

the management sub-platforms being configured to at least extract the amounts of the inventory accessories in the accessary supply data as first basic data after receiving the accessory supply data of the accessory supply devices corresponding to corresponding numbers;

determining demand amounts of accessories of the accessory supply devices corresponding to different production stages within a preset time; and comparing the first basic data with the demand amounts of the accessories in the management sub-platforms, judging whether the inventory of the accessories of the corresponding accessory supply device is sufficient, outputting comparison data and a judgment result, and sending the comparison data and the judgment result as the processing result data to the corresponding service sub-platform.

4. The industrial Internet of Things for controlling the supply of accessories of claim 3, wherein to determine the demand amounts of the accessories of the accessory supply devices corresponding to the different production stages within the preset time, the management platform is configured to:

obtain normal consumption amounts and abnormal loss amounts of accessories corresponding to the different production stages within the preset time;

obtain historical supply amounts of the accessory supply devices corresponding to the different production stages; and determine the demand amounts of the accessories of the accessory supply devices corresponding to the different production stages within the preset time based on the historical supply amounts, the normal consumption amounts, and the abnormal loss amounts.

5. The industrial Internet of Things for controlling the supply of accessories of claim 3, wherein to determine the demand amounts of the accessories of the accessory supply devices corresponding to the different production stages within the preset time, the management platform is configured to:

obtain production features and worker features of each production stage; and determine the demand amounts of the accessories of the accessory supply devices corresponding to the different production stages within the preset time by processing the production features and the worker features based on a first prediction model.

6. The industrial Internet of Things for controlling the supply of accessories of claim 3, wherein to determine the demand amounts of the accessories of the accessory supply devices corresponding to the different production stages within the preset time, the management platform is configured to:

obtain a direct loss rate of the accessories in each production stage;

obtain a rejection rate in the each production stage; and determine the demand amounts of the accessories of the accessory supply devices corresponding to the different production stages within the preset time based on the direct loss rate and the rejection rate.

7. The industrial Internet of Things for controlling the supply of accessories of claim 6, wherein to obtain the direct loss rate of the accessories in the each production stage, the management platform is configured to:

process production features of the each production stage based on a quality embedding layer and determine a feature vector corresponding to the each production stage; the quality embedding being is a machine learning model; and obtain the direct loss rate of the accessories in the each production stage by processing a feature vector of a single production stage in the each production stage based on a prediction layer of the direct loss rate; and the prediction layer of the direct loss rate being a machine learning model.

8. The industrial Internet of Things for controlling the supply of accessories of claim 7, wherein to obtain the rejection rate in the each production stage, the management platform is configured to:

process the feature vector corresponding to the each production stage based on a prediction layer of the rejection rate to determine the rejection rate in the each production stage; and the prediction layer of the rejection rate being a machine learning model.

9. The industrial Internet of Things for controlling the supply of accessories of claim 3, wherein the comparing the first basic data with the demand amounts of the accessories pre-stored in the management sub-platforms, judging whether the inventory of the accessories of the corresponding accessory supply device is sufficient includes:

obtaining a difference of accessories by subtracting the demand amount of the accessories from the first basic data and retaining a positive or negative symbol of the difference of the accessories;

judging that the inventory of the accessories of the accessory supply device is sufficient at this time based on the difference of the accessories being positive, and using the difference of the accessories and the judgment result as the processing result data; or judging that the inventory of the accessories of the accessory supply device is insufficient at this time based on the difference of the accessories being negative, and using the difference of the accessories and the judgment result as the processing result data.

10. The industrial Internet of Things for controlling the supply of accessories of claim 9, wherein the different management sub-platforms receive the different accessory supply data, and after data processing, store and send the processing result data to the different service sub-platforms including:

the management sub-platforms extracting rate of the accessory supply in the accessory supply data simultaneously after receiving the accessory supply data of the accessory supply devices corresponding to the numbers;

obtaining calculation results as second basic data by calculating the rate of the accessory supply and remaining production working time in the corresponding management sub-platforms, the remaining production working time being remaining total time needed to be supplied by the corresponding accessory supply devices;

obtaining a data difference and retaining a positive or negative symbol by performing a difference operation between the second basic data and the first basic data;

covering the first basic data by the second basic data based on the data difference being positive, and performing a comparison and a judgment by the second basic data and the demand amounts of the accessories; or deleting the second basic data based on the data difference being negative, and performing a comparison and a judgment by the first basic data and the demand amounts of the accessories directly.

11. The industrial Internet of Things for controlling the supply of accessories of claim 10, wherein after parsing the first instruction, the corresponding management sub-platform generates a second instruction recognized by the accessory supply devices based on the processing result data, and sends the second instruction to the sensor network platform including:

the user platform generating a process end instruction correspondingly as the first instruction when the difference of the accessories is positive; after parsing the first instruction, the corresponding management sub-platform deleting the stored processing result data, and stopping sending the second instruction; or the user platform generating an accessory supply instruction correspondingly as the first instruction when the difference of the accessories is negative; after parsing the first instruction, the corresponding management sub-platform using an absolute value of the difference of the accessories as supply amount data, generating the second instruction after performing the data processing on the supply amount data, the corresponding accessory supply device executing the operation of the accessory supply based on the supply amount data in the second instruction.

12. The industrial Internet of Things for controlling the supply of accessories of claim 11, wherein when the first instruction further includes a time of executing the accessory supply, the management sub-platform writes the time of executing the accessory supply into the second instruction after parsing the first instruction; and after receiving the second instruction, the corresponding accessory supply device extracts the time of executing the accessory supply and executes the operation of the accessory supply at the time of executing the accessory supply.

13. A control method for an industrial Internet of Things for controlling a supply of accessories, the industrial Internet of Things for controlling the supply of accessories comprising a user platform, a service platform, a management platform, a sensor network platform, and an object platform interacting in sequence, wherein the object platform is configured to include different accessory supply devices, each of which is configured with a data collector;

the control method comprising:

when each of the different accessory supply devices executes an operation of accessory supply:

collecting, by the data collector, amounts of inventory accessories and an average rate of the accessory supply of the accessory supply devices, packing the amounts of inventory accessories and the average rate of the accessory supply of the accessory supply device to form accessory supply data, and uploading the accessory supply data to the sensor network platform;

receiving, by the sensor network platform, the accessory supply data, performing numbering on the accessory supply data of the different accessory supply devices to form configuration files recognized by the management platform, and sending the configuration files to different management sub-platforms in the management platform according to numbers;

receiving, by the different management sub-platforms, the different accessory supply data, processing the different accessory supply data, storing and sending at least one processing result data to different service sub-platforms in the service platform;

receiving, by the different service sub-platforms, the corresponding processing result data and sending the corresponding processing result data to the user platform separately through a corresponding information channel;

generating, by the user platform, a first instruction to a corresponding service sub-platform based on the at least one processing result data;

receiving, by the corresponding service sub-platform, the first instruction and directly issuing the first instruction to a corresponding management sub-platform;

parsing the first instruction, by the corresponding management sub-platform, generating a second instruction recognized by the different accessory supply devices based on the at least one processing result data, and sending the second instruction to the sensor network platform;

issuing, by the sensor network platform, the second instruction to a corresponding accessory supply device based on a corresponding number; and executing, by the corresponding accessory supply device, an operation of accessory supply based on the second instruction.

14. The control method for the industrial Internet of Things for controlling the supply of accessories of claim 13, wherein a count of the management sub-platforms is equal to a count of the service sub-platforms, and the management sub-platforms and the service sub-platforms correspond one-by-one, each group of the corresponding management sub-platforms and the corresponding service sub-platforms corresponding to the accessory supply device with a same number.

15. The control method for the industrial Internet of Things for controlling the supply of accessories of claim 13, wherein the different management sub-platforms receive the different accessory supply data, and after data processing, store and send the at least one processing result data to the different service sub-platforms including:
at least extracting the amounts of the inventory accessories in the accessary supply data as first basic data after receiving the accessory supply data of the accessory supply devices corresponding to corresponding numbers by the management sub-platforms;
determining demand amounts of accessories of the accessory supply devices corresponding to different production stages within a preset time; and
comparing the first basic data with the demand amounts of the accessories in the management sub-platforms, judging whether the inventory of the accessories of the corresponding accessory supply device is sufficient, outputting comparison data and a judgment result, and sending the comparison data and the judgment result as the processing result data to the corresponding service sub-platform.

16. The control method for the industrial Internet of Things for controlling the supply of accessories of claim 15, wherein to determine the demand amounts of the accessories of the accessory supply devices corresponding to the different production stages within the preset time, the management platform is configured to:
obtain normal consumption amounts and abnormal loss amounts of accessories corresponding to the different production stages within the preset time;
obtain historical supply amounts of the accessory supply devices corresponding to the different production stages; and
determine the demand amounts of the accessories of the accessory supply devices corresponding to the different production stages within the preset time based on the historical supply amounts, the normal consumption amounts, and the abnormal loss amounts.

17. The control method for the industrial Internet of Things for controlling the supply of accessories of claim 15, wherein to determine the demand amounts of the accessories of the accessory supply devices corresponding to the different production stages within the preset time, the management platform is configured to:
obtain production features and worker features of each production stage; and
determine the demand amounts of the accessories of the accessory supply devices corresponding to the different production stages within the preset time by processing the production features and the worker features based on a first prediction model.

18. The control method for the industrial Internet of Things for controlling the supply of accessories of claim 15, wherein to determine the demand amounts of the accessories of the accessory supply devices corresponding to the different production stages within the preset time, the management platform is configured to:
obtain a direct loss rate of the accessories in each production stage;
obtain a rejection rate in each production stage; and
determine the demand amounts of the accessories of the accessory supply devices corresponding to the different production stages within the preset time based on the direct loss rate and the rejection rate.

19. The control method for the industrial Internet of Things for controlling the supply of accessories of claim 15, wherein the comparing the first basic data with the demand amounts of the accessories pre-stored in the management sub-platforms, judging whether the inventory of the accessories of the corresponding accessory supply device is sufficient, includes:
obtaining a difference of accessories by subtracting the demand amount of the accessories from the first basic data and retaining a positive or negative symbol of the difference of the accessories;
judging that the inventory of the accessories of the accessory supply device is sufficient at this time based on the difference of the accessories being positive, and using the difference of the accessories and the judgment result as the processing result data; or
judging that the inventory of the accessories of the accessory supply device is insufficient at this time based on the difference of the accessories being negative, and using the difference of the accessories and the judgment result as the processing result data.

20. The control method for the industrial Internet of Things for controlling the supply of accessories of claim 17, wherein the different management sub-platforms receive the different accessory supply data, and after data processing, store and send the processing result data to the different service sub-platforms, including:
extracting rate of the accessory supply in the accessory supply data simultaneously after receiving the accessory supply data of the accessory supply devices corresponding to the numbers by the management sub-platforms;
obtaining calculation results as second basic data by calculating the rate of the accessory supply and remaining production working time in the corresponding management sub-platforms, the remaining production working time being remaining total time needed to be supplied by the corresponding accessory supply devices;
obtaining a data difference and retaining a positive or negative symbol by performing a difference operation between the second basic data and the first basic data;
covering the first basic data by the second basic data based on the data difference being positive, and performing a comparison and a judgment by the second basic data and the demand amounts of the accessories; or
deleting the second basic data based on the data difference being negative, and performing a comparison and a judgment by the first basic data and the demand amounts of the accessories directly.

* * * * *